May 11, 1965     A. S. LAMBURN     3,182,528
PLANETARY DRIVE TRANSMISSION DEVICE
Filed May 24, 1962     3 Sheets-Sheet 1

May 11, 1965

A. S. LAMBURN 3,182,528

PLANETARY DRIVE TRANSMISSION DEVICE

Filed May 24, 1962

United States Patent Office 3,182,528
Patented May 11, 1965

---

3,182,528
PLANETARY DRIVE TRANSMISSION DEVICE
Alan S. Lamburn, Kencott, via Lechlade, England, assignor to Auto Transmissions Limited, Coventry, England
Filed May 24, 1962, Ser. No. 197,324
Claims priority, application Great Britain, June 9, 1961, 20,875/61
8 Claims. (Cl. 74—740)

The invention relates to a planetary drive transmission device of the kind including a sun element, a planet element and an annulus element and in which a control member is selectively operable either into a position in which it locks two of the elements together to inhibit the planetary motion whereby to provide a drive at unit ratio, or into a position in which it arrests one of the said elements so as to provide a drive at the ratio of the planetary gearing. The transmission device may be arranged so that planetary ratio provides overdrive, or it may be arranged so that planetary ratio provides underdrive. When a transmission device of this kind is operated from the planetary ratio, to the unit ratio in the case where the planetary ratio provides overdrive, or from the unit ratio to the planetary ratio in the case where the planetary ratio provides underdrive, a reduction in the ratio of the transmission occurs and, due to this reduction, a shock may be produced if the control member engages too suddenly the element providing the lower ratio drive. It is the object of the invention to mitigate that disadvantage.

According to the invention it is arranged for the control member to be moved against a bias by fluid-pressure-operated means for engaging the element for providing the higher ratio, and when the fluid pressure is relaxed for the control member to be moved by the bias to engage the element providing the lower ratio, for a proportion of the fluid pressure to be maintained so that the control member will engage the last-mentioned element with a less intensity of pressure than it would have done if subjected to the full bias load.

According to a further feature, and in the case where the fluid-pressure-operated means is a piston and cylinder arrangement adapted to receive the output from a pump, a by-pass passage is provided for the pump outlet and contains a stop valve and a relief valve in series with each other, the stop valve being adapted to be opened to cause a change from the higher to the lower ratio to be made so that the action of the full bias load on the control member will be reduced according to the setting of the relief valve, the stop valve being adapted to be closed so that the pump output moves the control member against its bias so as to cause a change from the lower to the higher ratio.

According to another feature, and in the case where the planetary drive transmission device is adapted to be operatively connected with a change-speed gearbox having a reverse gear, means is provided for exhausting the said proportion of the fluid pressure when the reverse ratio is engaged so that the control member will engage the element for providing the lower ratio with the full bias load. In such a case and according to yet another feature an exhaust passage containing a stop valve is provided for the pump outlet and this stop valve is adapted to be opened whenever the said reverse gear of the said change-speed gearbox is engaged so that the control member will engage the element providing the lower ratio with the full bias load.

Preferably the maximum fluid pressure that can act against the said bias is determined by a pressure relief valve.

The invention is illustrated with reference to the accompanying drawings, in which.

Figure 1:
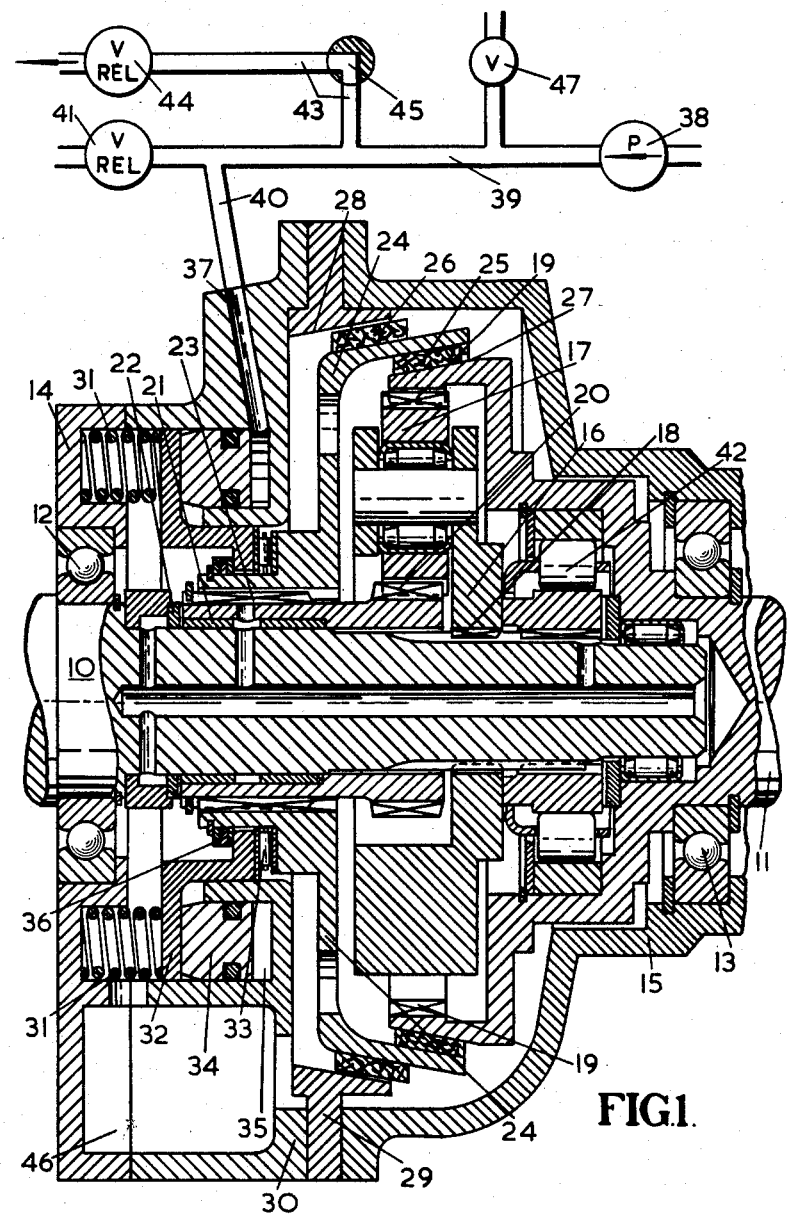
FIGURE 1 is a vertical section through one embodiment of invention illustrating the application of the invention to an overdrive.

FIGURE 1 shows a planetary drive transmission device for providing overdrive in at least one selected forward ratio of a change-speed gearing of a motor vehicle, which gearing also provides a low ratio reverse gear. The planetary drive transmission device, which of itself forms no part of the present invention, includes an input shaft 10 and an aligned output shaft 11 journalled in bearings 12, 13 carried by casing members 14 and 15. A carrier 16 for the planet wheel 17 is held rotatively fast by splines 18 with the input shaft 10, an annulus gear wheel 19 is formed integral with the output shaft 11, and the sun gear wheel 20 is journalled at 21 on the input shaft 10 but is axially located by thrust washer 22 and has a splined connection 23 with a control member 24 carrying a frusto-conical clutch pad 25 and a frusto-conical brake pad 26. The control member 24 can be slid axially on the splines 23 of the sun gear in one direction for the surface of the clutch pad 25 to engage over a complementary clutch surface 27 of the annulus gear wheel 19, whereby to lock the sun gear 20 to the annulus gear 19 so as to inhibit the planetary motion and to provide drive transmission at unit ratio (i.e., a drive transmission at the selected ratio of the change-speed gearing). The control member 24 can be slid in the opposite axial direction for the surface of the brake pad 26 to engage in a complementary brake surface 28 of brake ring 29 which is fast with the casing members 14, 15 and 30 and thereby holds the sun gear wheel 20 stationary for the drive to be transmitted through the gearing at the planetary ratio.

A plurality of axially-directed compression springs 31 are arranged in a circle about the common axis of the input and output shafts and react between the casing member 14 and an annular thrust member 32 which normally bears on the control member 24 through thrust race 33 to hold the clutch pad 25 of the said control member engaged with the clutch surface 27 of the annulus gear wheel 19. The annular thrust member 32 is adapted to be urged against the effort of the springs 31 by fluid pressure acting on a coaxial annular piston 34 working in an annular cylinder 35 formed in the casing member 30. When the annular thrust member 32 is urged against the springs 31 it reacts on the control member 24 through washers 36 to disengage clutch pad 25 from clutch surface 27 of the annulus gear wheel and to hold the brake pad 26 engaged with the brake surface 28 of brake ring 29 whereby to hold the sun wheel 20 stationary. Thus, by supplying fluid pressure through conduit 37 to annular cylinder 35, the gear ratio is changed from unit ratio to the planetary overdrive ratio. The fluid pressure is derived from a pump 38 of which the delivery is connected by pipes 39, 40 and conduit 37 to the said annular cylinder, and the pressure is prevented from exceeding a desired maximum value by a relief valve 41.

A one-way clutch 42 of conventional form is arranged between the input shaft 10 and the output shaft 11 to prevent the latter from rotating slower than the input shaft.

The reverse gear ratio of the change-speed gearing of motor road vehicles is normally of a lower ratio than all forward gear ratios, with the possible exception of first gear ratio, and it is necessary that the compression springs 31 are of such rating as to urge the control member 24 into engagement with the clutch surface 27 of the annulus gear wheel 19 with a sufficient force for the reverse gear drive to be transmitted without the clutch 25, 27 slipping. The force required from the compression springs 31 for this purpose is found, however, to be unnecessarily high when changing from the planetary overdrive ratio to unit ratio in any of the forward ratios for which "overdrive" is provided, with the result that such a change gives rise to a shock in the transmission.

In accordance with the invention, however, a planetary drive transmission device constituting an overdrive is provided, in the connection 39, 40 from the pump output to the annular cylinder 35, with a by-pass 43 containing a second relief valve 44 which is set to operate at a lower pressure than that of relief valve 41, the by-pass 43 being controlled by a stop valve 45 which is operated to open condition, as shown by FIGURE 1, whenever "overdrive" is switched off and to closed position whenever "overdrive" is switched on. Thus, if a fluid pressure of, say, 160 p.s.i. in the annular cylinder 35 is necessary to overcome the effort of the springs 31 and to hold the planetary overdrive ratio engaged with a desirable force between brake pad 26 and complementary brake surface 28, it will be arranged for relief valve 41 to be adapted to open at that fluid pressure in order that the said desirable force shall not be exceeded. If, then, relief valve 44 is set to operate at, say, 10 p.s.i., the opening of stop valve 45 to switch off "overdrive" will cause 10 p.s.i. to oppose the action of the springs 31 for engaging unit ratio, so that the clutch pad 25 will be urged into engagement with clutch surface 27 of the annulus gear wheel 19 with a smaller force than that due solely to the compression springs 31, and thus cushion the engagement.

Figure 3:
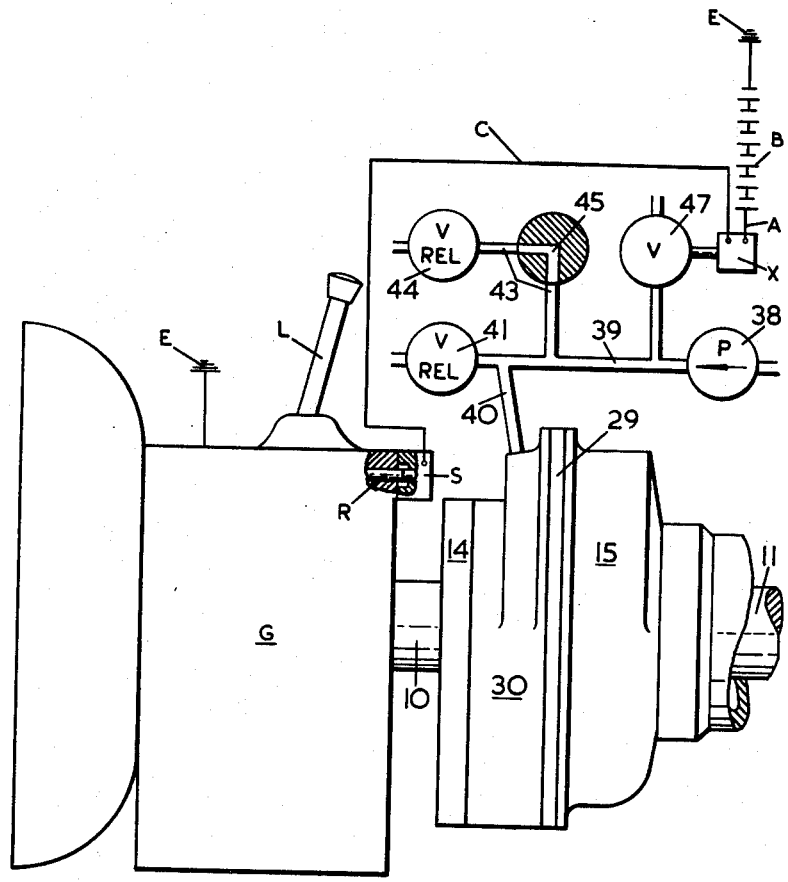
FIGURE 3 is a side elevation of the embodiment of FIGURE 1 in conjunction with a change-speed gearbox provided with a reverse gear ratio.

It is arranged that, when reverse gear in the said change-speed gear box is engaged, the whole of the fluid pressure will be withdrawn from the annular cylinder 35 so as to allow the clutch pad 25 to engage the clutch surface 27 of the annulus gear wheel 19 under the full effort of the springs. Thus, if the pump 38 is a one-way-acting one which delivers back into the sump 46, and is driven in reverse when reverse gear ratio is engaged, the whole of the fluid pressure will be withdrawn from the annular cylinder 35 when the reverse gear ratio is used. On the other hand while if the pump is a reversible one (e.g., a piston type pump) which, when it is driven reversely still supplies pressure, an additional stop valve 47 is arranged to be opened by the act of selecting reverse gear ratio so as to relieve the annular cylinder 35 from all fluid pressure and thereby allow the full force of springs 31 to act on the control member 24. Such an arrangement is illustrated in FIGURE 3 in which the embodiment of FIGURE 1 is shown in elevation with its elements identified with the same reference numerals. In FIGURE 3 the input shaft 10 is driven from a change-speed gearbox G which is provided with a reverse and forward ratios and has a gear lever L adapted to be moved in known manner to select different ratios through the action of selector rods R only one of which is shown. The selector rod that is shown is longitudinally reciprocable to the left from the position shown, in which it causes the reverse ratio to be selected, to a position in which a forward ratio is engaged. The valve 47 is operable to its open position when solenoid X is energised. The latter has one D.C. terminal A permanently connected to a battery B, and has its other terminal C permanently connected to a make or break switch S mounted on the rear of gearbox G. The switch S and battery B are permanently connected by earth connections E to the vehicle chassis frame. The switch S is so arranged that it is operated by the selector rod R to the make condition when the reverse ratio is selected, and to the break condition when a forward ratio is selected. In this manner valve 47 is automatically opened by its solenoid X whenever the reverse ratio is selected.

The pump 38 would conventionally be driven from input shaft 10 and would draw its supply of fluid from sump 46, the outlets of valves 41, 44 and 47 being arranged to discharge into the sump.

Figure 2:
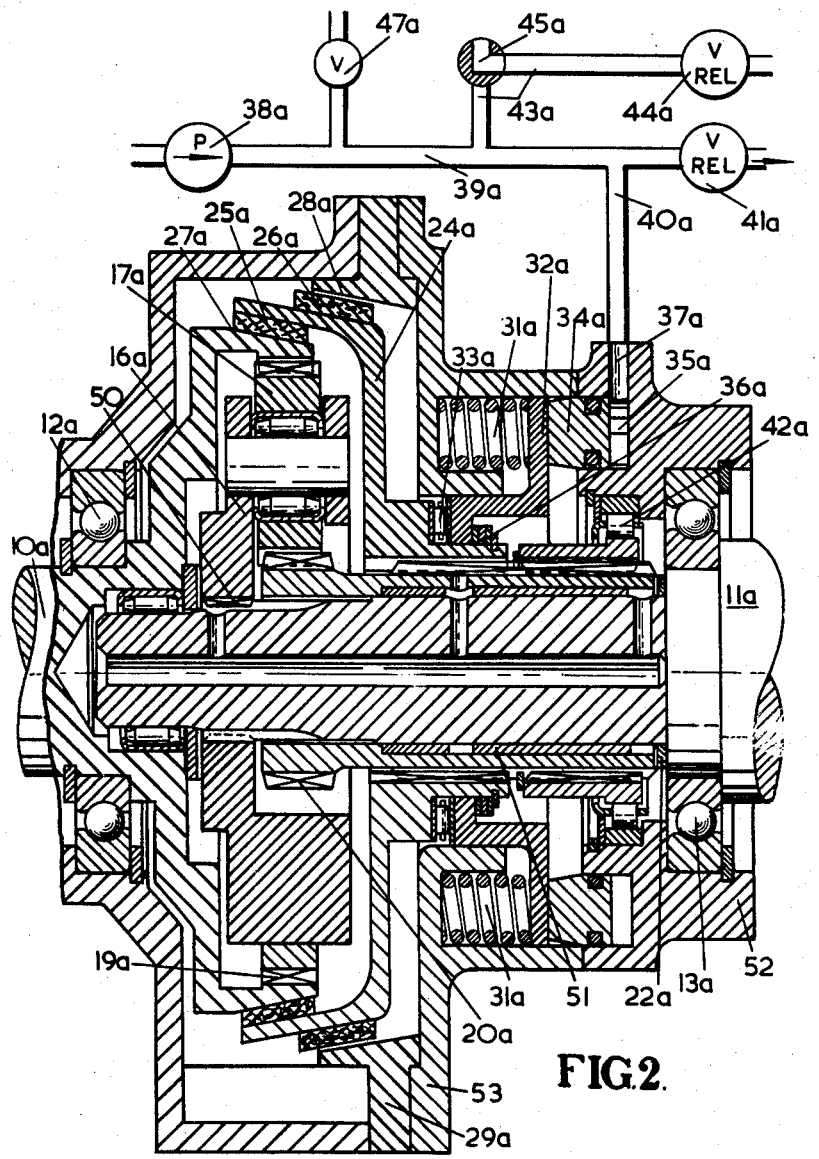
FIGURE 2 is a vertical section through another embodiment of the invention illustrating the application of the invention to an underdrive.

FIGURE 2 shows a planetary drive transmission device for providing underdrive in at least one selected forward ratio of a change-speed gearing of a motor vehicle, which gearing also provides a low ratio reverse gear. The planetary drive transmission device, which of itself forms no part of the present invention, is similar in many respects to that described with reference to FIGURE 1. Accordingly, corresponding parts will not be described in detail and will be given the same reference numerals as used for FIGURE 1 but suffixed "a."

The main structural differences between the overdrive of FIGURE 1 and the underdrive of FIGURE 2 are that in the latter the input shaft 10a is formed integral with the annulus gear wheel 19a, the carrier 16a for the planet wheel 17a is held rotatively fast by splines 50 with the output shaft 11a, the sun gear wheel 20a is journalled at 51 on the output shaft 11a, and the one-way brake 42a is arranged between casing member 52 and the sun gear wheel 20a to prevent the latter from rotating in one direction so as to prevent the output shaft 11a from rotating faster than the input shaft 10a.

The springs 31a react between casing member 53 and the annular thrust member 32a which normally bears on the control member 24a through thrust race 33a to hold the brake pad 26a engaged with brake surface 28a to give the planetary underdrive ratio. Application of fluid pressure from pump 38a through conduit 37a moves annular piston 34a against the action of springs 31a to disengage the planetary underdrive ratio and to engage the unit ratio.

As previously stated the springs 31a have to be of such a rating as to exert sufficient force on the control member 24a for the reverse gear drive to be transmitted without the brake 26a, 28a slipping. This force is, however, unnecessarily high when changing from unit ratio to planetary underdrive ratio in any of the forward gears and gives rise to a shock in the transmission when such a change is made.

In accordance with the invention, however, a planetary drive transmission device constituting an underdrive is provided with relief valves 41a and 44a and stop valves 45a and 47a which, as previously described, allow the full force of springs 31a to be applied when reverse ratios are being used and prevent the said full force being applied in forward ratios so as to cushion the engagement of planetary underdrive ratio when a change is made from unit ratio to the planetary underdrive ratio.

The pump 38a would conventionally be driven from the input shaft 10a and would draw its supply of fluid from sump 46a, the outlets of valves 41a, 44a and 47a being arranged to discharge into the sump.

What I claim as my invention and desire to secure by Letters Patent of the United States is:

1. A planetary drive transmission device comprising a sun gear wheel, an annulus gear wheel, planet gear wheel means and a carrier for said planet gear wheel means, an input shaft and an output shaft, said sun and annulus gear wheels and said carrier and said shafts being coaxial with each other, a drive connection between one of said shafts and said carrier, a drive connection between the other of said shafts and said annulus gear wheel, a stationary casing for said sun and annulus gear wheels and said carrier, said shafts journalled in said casing, a control member coaxial with said shafts, drive means interconnecting said control member and sun gear wheel, said interconnecting drive means permitting said control member to be moved axially relatively to said sun gear wheel, a brake surface on said casing, a clutch surface on said annulus gear wheel, said brake and clutch surfaces coaxial with said control member, means biasing said control member axially in one direction to engage one of said surfaces so as to provide transmission at one ratio, fluid-pressure-operated means, means for supplying fluid pressure to said fluid-pressure-operated means to urge said control member axially in the other direction against said biasing means to engage the other of said surfaces so as to provide transmission at another ratio, said one ratio being lower than said another ratio, first valve means operable to exhaust the said fluid pressure from said fluid-pressure-operated means to allow said biasing means to move said control member to engage said one ratio, and second valve means operable in conjunction with said first valve means to maintain a proportion of the said fluid pressure in said fluid-pressure-operated means partially to oppose the said biasing means whereby to prevent the said one ratio from being engaged by the full effort of said biasing means.

2. A planetary drive transmission device comprising a sun gear wheel, an annulus gear wheel, planet gear wheel means and a carrier for said planet gear wheel means, an input shaft and an output shaft, said sun and annulus gear wheels and said carrier and said shafts being coaxial with each other, a drive connection between said input shaft and said carrier, a drive connection between said output shaft and said annulus gear wheel, a stationary casing for said sun and annulus gear wheels and said carrier, said shafts journalled in said casing, a control member coaxial with said shafts, drive means interconnecting said control member and sun gear wheel, said interconnecting drive means permitting said control member to be moved axially relatively to said sun gear wheel, one-way driving means operatively between said input shaft and said output shaft to prevent said output shaft from rotating slower than said input shaft, a brake surface on said casing, a clutch surface on said annulus gear wheel, said brake and clutch surfaces coaxial with said control member, means biasing said control member axially in one direction to engage said clutch surface of said annulus gear wheel so as to provide transmission at unit ratio, fluid-pressure-operated means, means for supplying fluid pressure to said fluid-pressure-operated means to urge said control member axially in the other direction against said biasing means to engage said brake surface of said casing so as to provide transmission at planetary overdrive ratio, first valve means operable to exhaust the said fluid pressure from said fluid-pressure-operated means to allow said biasing means to move said control member to engage said unit ratio, and second valve means operable in conjunction with said first valve means to maintain a proportion of the said fluid pressure in said fluid-pressure-operated means partially to oppose the said biasing means whereby to prevent the said unit ratio from being engaged by the full effort of said biasing means.

3. A planetary drive transmission device comprising a sun gear wheel, an annulus gear wheel, planet gear wheel means and a carrier for said planet gear wheel means, an input shaft and an output shaft, said sun and annulus gear wheels and said carrier and said shafts being coaxial with each other, a drive connection between said output shaft and said carrier, a drive connection between said input shaft and said annulus gear wheel, a stationary casing for said sun and annulus gear wheels and said carrier, said shafts journalled in said casing, a control member coaxial with said shafts, drive means interconnecting said control member and sun gear wheel, said interconnecting drive means permitting said control member to be moved axially relatively to said gun gear wheel, one-way connecting means operative between said sun gear wheel and said casing to prevent said sun wheel from rotating in one direction so as to prevent the said output shaft from rotating faster than said input shaft, a brake surface on said casing, a clutch surface on said annulus gear wheel, said brake and clutch surfaces coaxial with said control member, means biasing said control member axially in one direction to engage said brake surface of said casing so as to provide transmission at planetary underdrive ratio, fluid-pressure-operated means, means for supplying fluid pressure to said fluid-pressure-operated means to urge said control member axially in the other direction against said biasing means to engage said clutch surface of said annulus gear wheel so as to provide transmission at unit ratio, first valve means operable to exhaust the said fluid pressure from said fluid-pressure-operated means to allow said biasing means to move said control member to engage said planetary underdrive ratio, and second valve means operable in conjunction with said first valve means to maintain a proportion of the said fluid pressure in said fluid-pressure-operated means partially to oppose the said biasing means whereby to prevent the said planetary underdrive ratio from being engaged by the full effort of the said biasing means.

4. A planetary drive transmission device comprising a sun gear wheel, an annulus gear wheel, planet gear wheel means and a carrier for said planet gear wheel means, an input shaft and an output shaft, said sun and annulus gear wheels and said carrier and said shafts being coaxial with each other, a drive connection between one of said shafts and said carrier, a drive connection between the other of said shafts and said annulus gear wheel, a stationary casing for said sun and annulus gear wheels and said carrier, said shafts journalled in said casing, a control member coaxial with said shafts, drive means interconnecting said control member and sun gear wheel, said interconnecting drive means permitting said control member to be moved axially relatively to said sun gear wheel, a brake surface on said casing, a clutch surface on said annulus gear wheel, said brake and clutch surfaces coaxial with said control member, means biasing said control member axially in one direction to engage one of said surfaces so as to provide transmission at one ratio, fluid-pressure-operated means, means for supplying fluid pressure to said fluid-pressure-operated means to urge said control member axially in the other direction against said biasing means to engage the other of said surfaces so as to provide transmission at another ratio, said one ratio being lower than said another ratio, first valve means operable to exhaust the said fluid pressure from said fluid-pressure-operated means to allow said biasing means to move said control member to engage said one ratio, and second valve means operable in conjunction with said first valve means to maintain a proportion of the said fluid pressure in said fluid-pressure-operated means partially to oppose the said biasing means whereby to prevent the said one ratio from being engaged by the full effort of the said biasing means, said input shaft adapted to be driven from a change-speed gearbox having a reverse ratio, third valve means operable by selection of said reverse ratio in said change-speed gearbox to exhaust the said maintained proportion of the said fluid pressure whereby to allow the full effort of said biasing means to engage the said one ratio.

5. A planetary drive transmission device comprising a sun gear wheel, an annulus gear wheel, planet gear wheel means and a carrier for said planet gear wheel means, an input shaft and an output shaft, said sun and annulus gear wheels and said carrier and said shafts being coaxial with each other, a drive connection between said input shaft and said carrier, a drive connection between said output shaft and said annulus gear wheel, a stationary casing for said sun and annulus gear wheels and said carrier, said shafts journalled in said casing, a control member coaxial with said shafts, drive means interconnecting said control member and sun gear wheel, said interconnecting drive means permitting said control member to be moved axially relatively to said sun gear wheel, one-way driving means operatively between said input shaft and said output shaft to prevent said output shaft from rotating slower than said input shaft, a brake surface on said casing, a clutch surface on said annulus gear wheel, said brake and clutch surfaces coaxial with said control member, means biasing said control member axially in one direction to engage said clutch surface of said annulus gear wheel so as to provide transmission at unit ratio, fluid-pressure-operated means, means for supplying fluid pressure to said fluid-pressure-operated means to urge said control member axially in the other direction against said biasing means to engage said brake surface of said casing so as to provide transmission at planetary overdrive ratio, first valve means operable to exhaust the said fluid pressure from said fluid-pressure-operated means to allow said biasing means to move said control member to engage said unit ratio, and second valve means operable in conjunction with said first valve means to maintain a proportion of the said fluid pressure in said fluid-pressure-operated means partially to oppose the said biasing means whereby to prevent the said unit ratio from being engaged by the full effort of said biasing means, said input shaft adapted to be driven from a change-speed gearbox having a reverse ratio, third valve means operable by selection of said reverse ratio in said change-speed gearbox to exhaust the said maintained proportion of the said fluid pressure whereby to allow the full effort of said biasing means to engage the said unit ratio.

6. A planetary drive transmission device comprising a sun gear wheel, an annulus gear wheel, planet gear wheel means and a carrier for said planet gear wheel means, an input shaft and an output shaft, said sun and annulus gear wheels and said carrier and said shafts being coaxial with each other, a drive connection between said output shaft and said carrier, a drive connection between said input shaft and said annulus gear wheel, a stationary casing for said sun and annulus gear wheels and said carrier, said shafts journalled in said casing, a control member coaxial with said shafts, drive means interconnecting said control member and sun gear wheel, said interconnecting drive means permitting said control member to be moved axially relatively to said sun gear wheel, one-way connecting means operative between said sun gear wheel and said casing to prevent said sun wheel from rotating in one direction so as to prevent the said output shaft from rotating faster than said input shaft, a brake surface on said casing, a clutch surface on said annulus gear wheel, said brake and clutch surfaces coaxial with said control member, means biasing said control member axially in one direction to engage said brake surface of said casing so as to provide transmission at planetary underdrive ratio, fluid-pressure-operated means, means for supplying fluid pressure to said fluid-pressure-operated means to urge said control member axially in the other direction against said biasing means to engage said clutch surface of said annulus gear wheel so as to provide transmission at unit ratio, first valve means operable to exhaust the said fluid pressure from said fluid-pressure-operated means to allow said biasing means to move said control member to engage said planetary underdrive ratio, and second valve means operable in conjunction with said first valve means to maintain a proportion of the said fluid pressure in said fluid-pressure-operated means partially to oppose the said biasing means whereby to prevent the said planetary underdrive ratio from being engaged by the full effort of the said biasing means, said input shaft adapted to be driven from a change-speed gearbox having a reverse ratio, third valve means operable by selection of said reverse ratio in said change-speed gearbox to exhaust the said maintained proportion of the said fluid pressure whereby to allow the full effort of said biasing means to engage the said planetary underdrive ratio.

7. A planetary drive transmission device including a sun gear wheel, an annulus gear wheel and a planet gear wheel, said planet gear wheel simultaneously meshing with both the said annulus gear wheel and the said sun gear wheel, a carrier for the said planet gear wheel, an input shaft connected to drive the said carrier and its associated planet gear wheel, an output shaft connected to be driven by the said annulus gear wheel, the said output shaft being coaxial with the said input shaft, a non-rotary casing, bearing means for rotatively supporting the input shaft and the output shaft in said non-rotary casing, bearing means for rotatively supporting the said sun gear wheel on the said input shaft, one-way driving means operatively between said input shaft and said output shaft to prevent said output shaft from rotating slower than said input shaft, a control member coaxial with the said sun gear wheel, splines holding the said control member rotatively fast with the said sun gear wheel and allowing relative axial movement between them, a clutch surface rotatively fast with the said annulus gear wheel, a clutch surface rotatively fast with the said control member for engaging the said clutch surface of the annulus gear wheel to inhibit the planetary motion of the said planet gear wheel so as to provide a drive between the said input shaft and the said output shaft at unit ratio, a brake surface rotatively fast with the said non-rotary casing, a brake surface rotatively fast with the said control member for engaging the said brake surface of the non-rotary casing to cause the said planet gear wheel to describe a planetary motion so as to provide a drive between the said input shaft and the said output shaft at planetary overdrive ratio, spring means for biasing the control member to engage said unit ratio, a supply of fluid pressure, a piston and cylinder arrangement for receiving the said supply of fluid pressure, the said piston being arranged to act on the said control member to cause brake member to move against the said spring means so as to engage said planetary overdrive ratio, valve means for regulating the said supply of fluid pressure to the said piston and cylinder arrangement so that a proportion of the said fluid pressure still acts in the said piston and cylinder arrangement when said unit ratio is engaged whereby the full force available from the said spring means is not applied for the engagement of the said clutch surface fast with the annulus gear wheel with the said clutch surface of the control member.

8. A planetary drive transmission device including a sun gear wheel, an annulus gear wheel and a planet gear wheel, said planet gear wheel simultaneously meshing with both the said annulus gear wheel and the said sun gear wheel, a carrier for the said planet gear wheel, an output shaft connected to be driven by the said carrier and its associated planet gear wheel, an input shaft connected to drive the said annulus gear wheel, the said output shaft being coaxial with the said input shaft, a non-rotary casing, bearing means for rotatively supporting the input shaft and the output shaft in said non-rotary casing, bearing means for rotatively supporting the said sun gear wheel on the said output shaft, one-way connecting means operative between said sun gear wheel and said casing to prevent said sun wheel from rotating in one direction so as to prevent the said output shaft from rotating faster than said input shaft, a control member coaxial with the said sun gear wheel, splines holding the said control member rotatively fast with the said sun gear wheel and allowing relative axial movement between them, a clutch surface rotatively fast with the said annulus gear wheel, a clutch surface rotatively fast with the said control member for engaging the said clutch surface of the annulus gear wheel to inhibit the planetary motion of the said planet gear wheel so as to provide a drive between the said input shaft and the said output shaft at unit ratio, a brake surface rotatively fast with the said non-rotary casing, a brake surface rotatively fast with the said control member for engaging the said brake surface of the non-rotary casing to cause the said planet gear wheel to describe a planetary motion so as to provide a drive between the said input shaft and the said output shaft at planetary underdrive ratio, spring means for biasing the control member to engage said planetary underdrive ratio, a supply of fluid pressure, a piston and cylinder arrangement for receiving the said supply of fluid pressure, the said piston being arranged to act on the said control member to cause the control member to move against the said spring means so as to engage said unit ratio, valve means for regulating the said supply of fluid pressure to the said piston and cylinder arrangement so that a proportion of the said fluid pressure still acts in the said piston and cylinder arrangement when said planetary underdrive ratio is engaged whereby the full force available from the said spring means is not applied for the engagement of the said brake surface fast with the non-rotary casing with the said brake surface of the control member.

References Cited by the Examiner

UNITED STATES PATENTS

| 2,437,467 | 3/48 | Herring et al. | 74—781 |
| 2,559,922 | 7/51 | Alspaugh | 74—781 |
| 2,851,907 | 9/58 | Normanville | 74—781 |
| 2,909,077 | 10/59 | Kamins | 74—781 |

FOREIGN PATENTS 155,429   1/39   Austria.

DON A. WAITE, *Primary Examiner.*